(12) United States Patent
Sutton et al.

(10) Patent No.: US 7,159,888 B1
(45) Date of Patent: Jan. 9, 2007

(54) MODULAR TRANSPORT VEHICLE AND METHOD OF USE

(75) Inventors: Earl Sutton, Las Vegas, NV (US); James R. McGhie, Henderson, NV (US)

(73) Assignee: American Heavy Moving & Rigging, Inc., Chino, CA (US)

( * ) Notice: Subject to any disclaimer, the term of this patent is extended or adjusted under 35 U.S.C. 154(b) by 0 days.

(21) Appl. No.: 10/443,551

(22) Filed: May 22, 2003

Related U.S. Application Data

(60) Provisional application No. 60/383,554, filed on May 24, 2002.

(51) Int. Cl.
  *B60D 53/00* (2006.01)

(52) U.S. Cl. .............. 280/411.1; 280/408; 280/406.1; 280/412

(58) Field of Classification Search .............. 280/404, 280/406.1, 407.1, 408, 411.1, 412, 415.1, 280/81.1, 81.5, 81.6, 656, 638; 403/292–294, 403/62, 150, 157
See application file for complete search history.

(56) References Cited

U.S. PATENT DOCUMENTS

| | | | | |
|---|---|---|---|---|
| 3,436,098 A | * | 4/1969 | Orendorff et al. | 280/412 |
| 3,446,365 A | * | 5/1969 | Wriedt | 213/78 |
| 3,738,682 A | * | 6/1973 | Ritter | 280/413 |
| 3,993,342 A | * | 11/1976 | Jones et al. | 410/24.1 |
| 4,130,295 A | * | 12/1978 | Davis | 280/412 |
| 4,213,628 A | * | 7/1980 | Hardesty | 280/412 |
| 4,225,259 A | * | 9/1980 | Baldwin et al. | 403/62 |
| 4,943,078 A | * | 7/1990 | McGhie et al. | 280/408 |
| 5,020,960 A | * | 6/1991 | Provenson | 414/494 |
| 5,700,023 A | * | 12/1997 | Picard | 280/426 |
| 6,000,708 A | * | 12/1999 | Harp et al. | 280/411.1 |
| 6,193,257 B1 | * | 2/2001 | Lutz | 280/408 |

* cited by examiner

*Primary Examiner*—Lesley D. Morris
*Assistant Examiner*—L. Lum

(57) ABSTRACT

A modular transport vehicle includes a plurality of dollies which are removably connected to a central spine. Because the components of the present invention may be disconnected, the transport vehicle may be readily disassembled and moved from location to location using conventional transportation means. The modularity also allows the width of the transport vehicle to be adjusted using different widths of connectors to accommodate road conditions and/or governmental regulations.

5 Claims, 8 Drawing Sheets

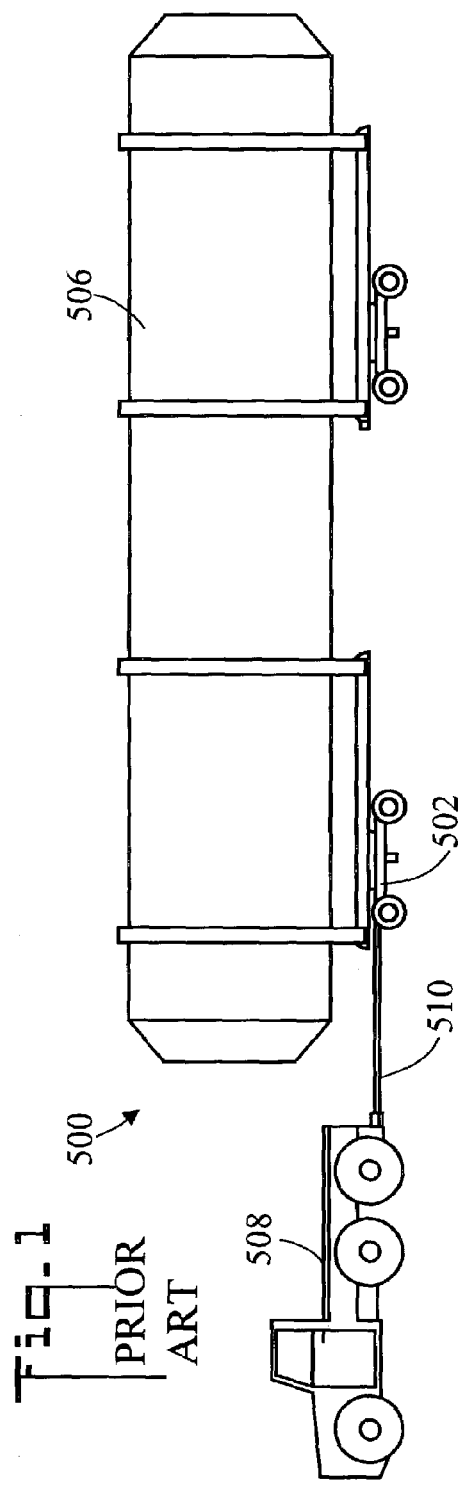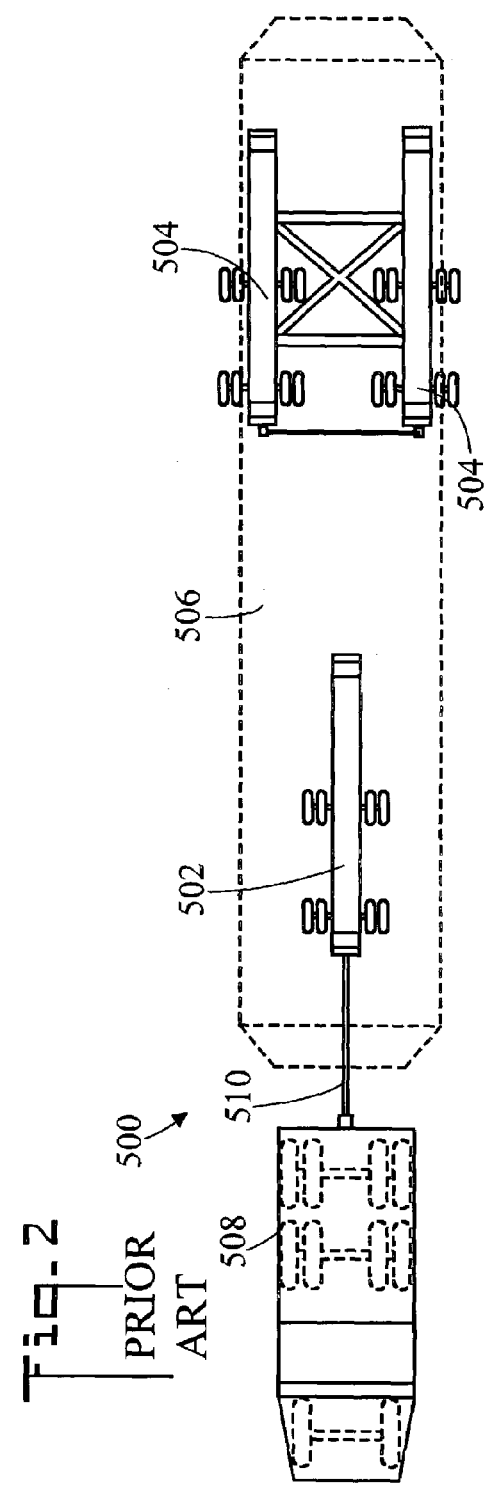

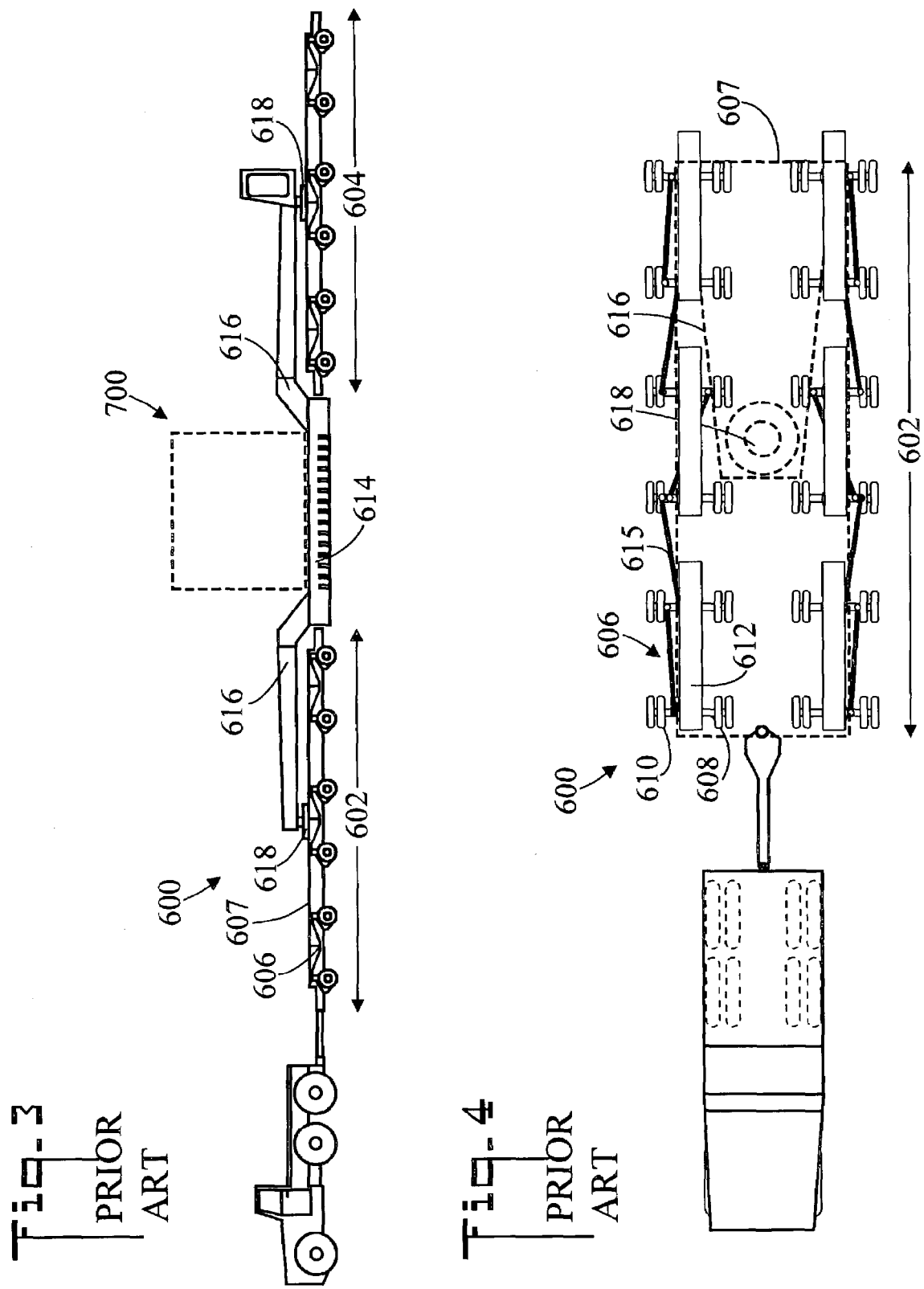

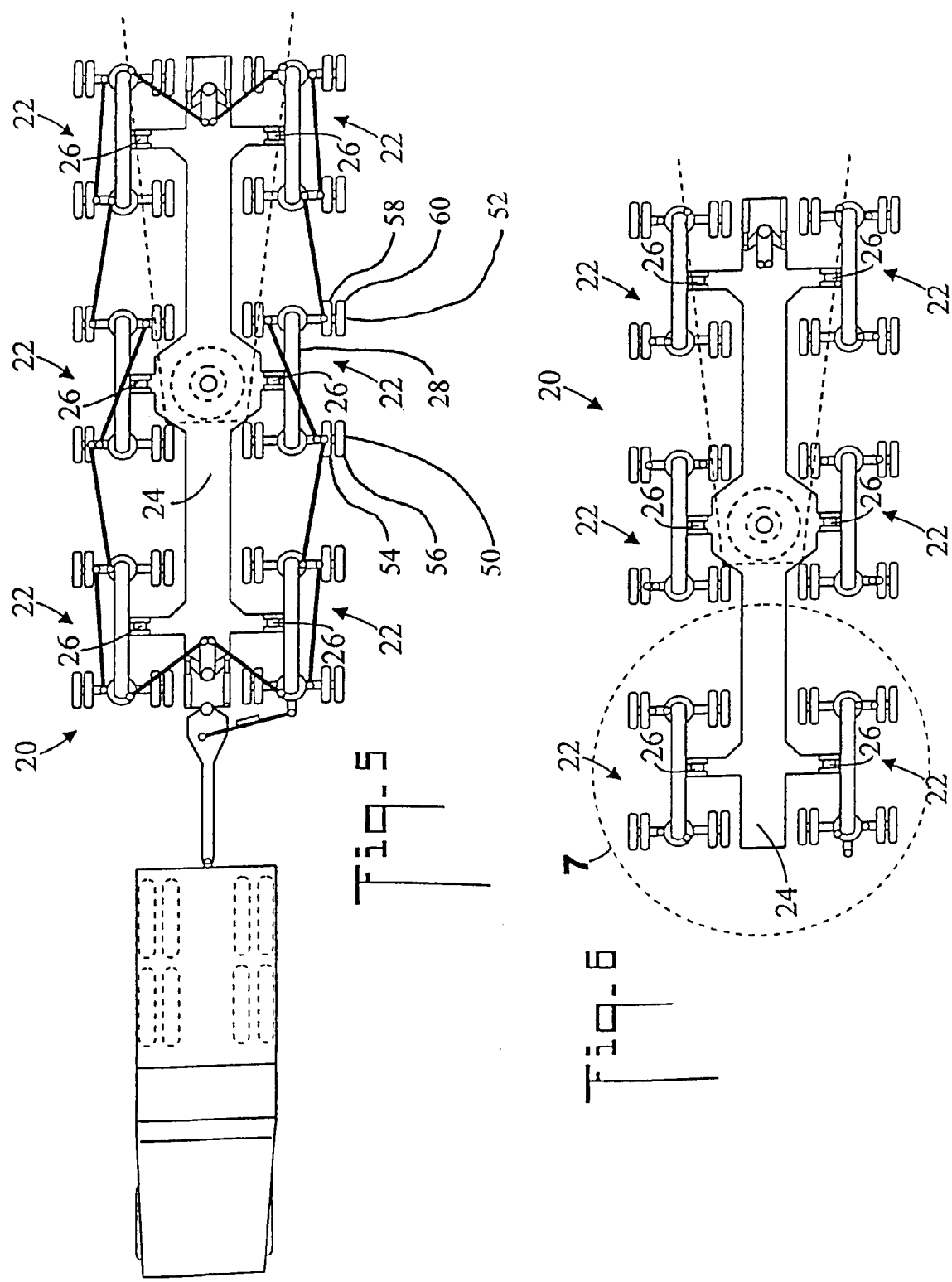

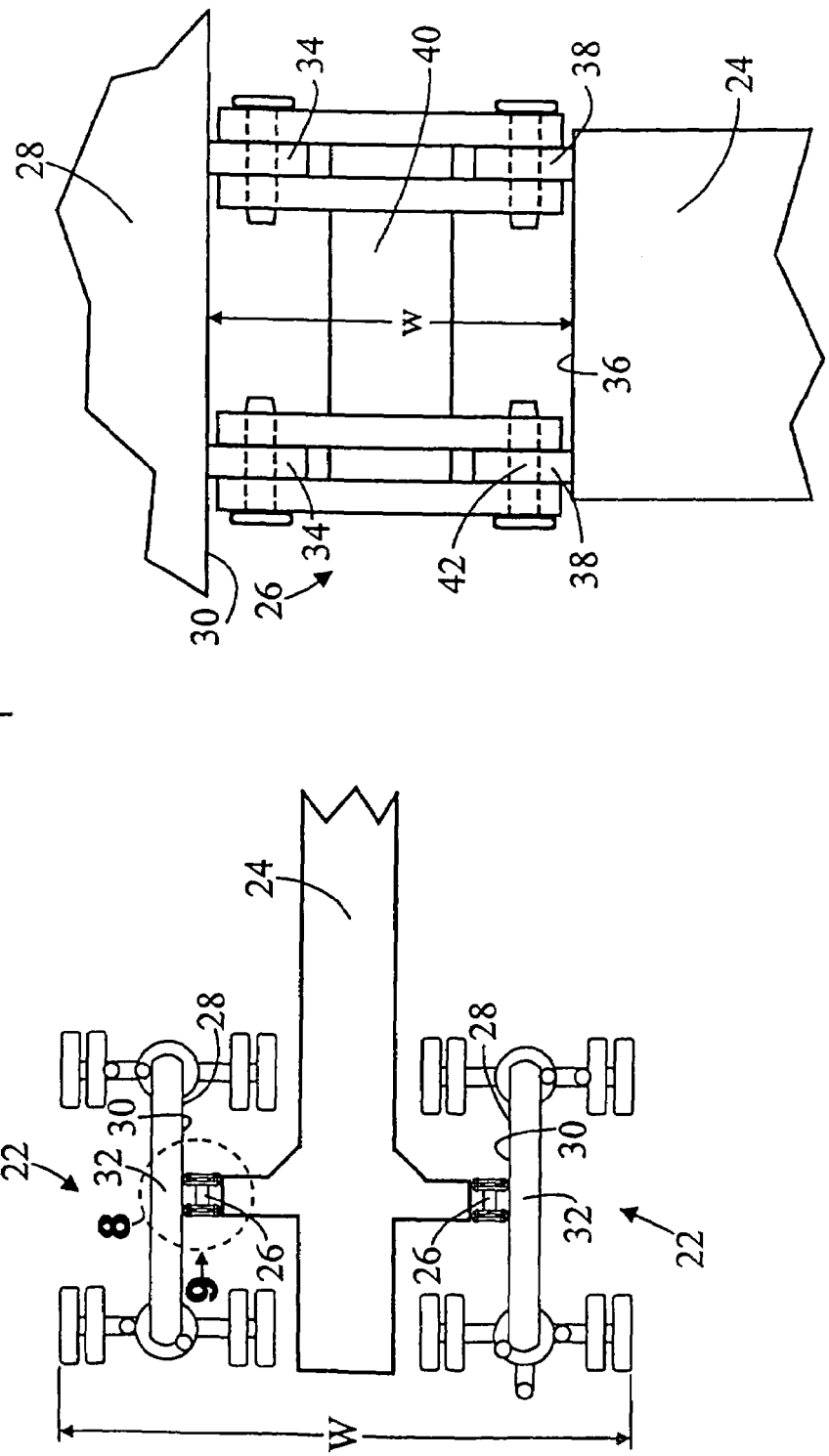

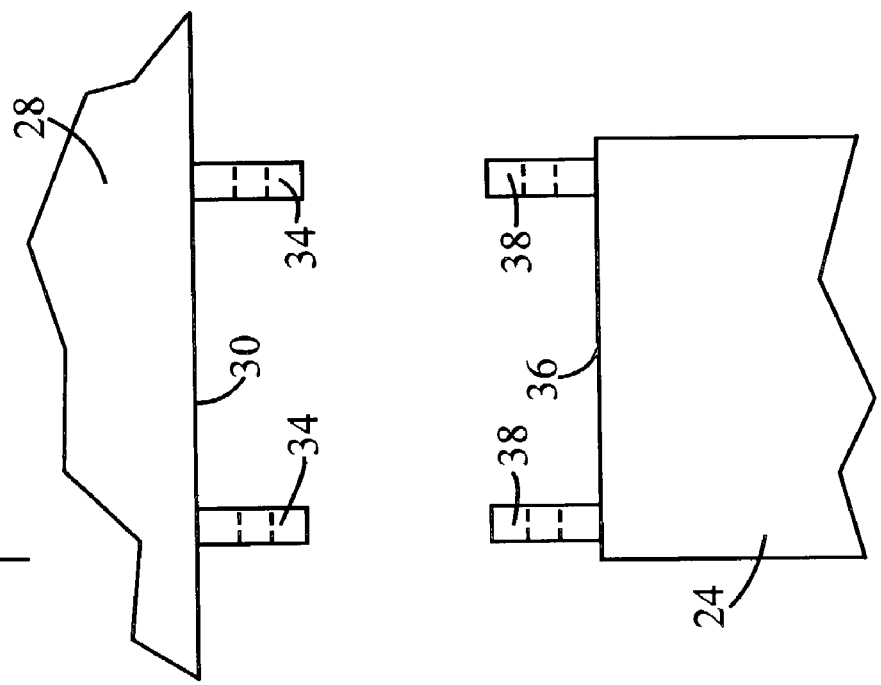
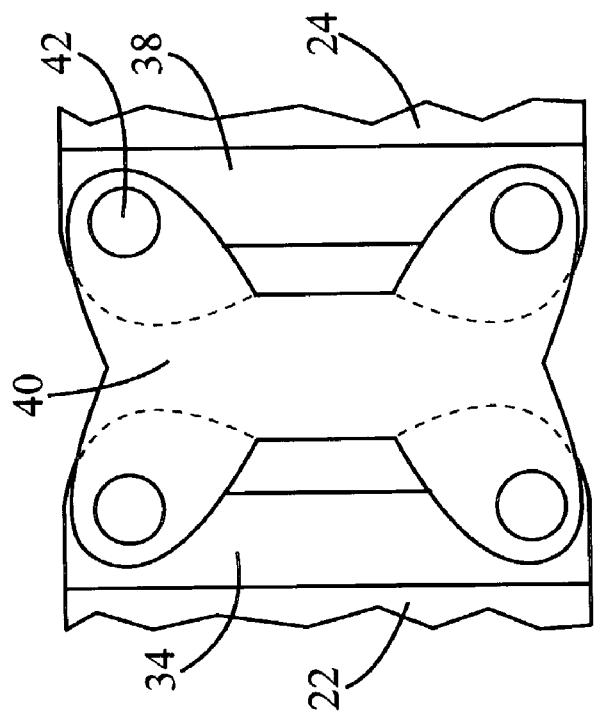

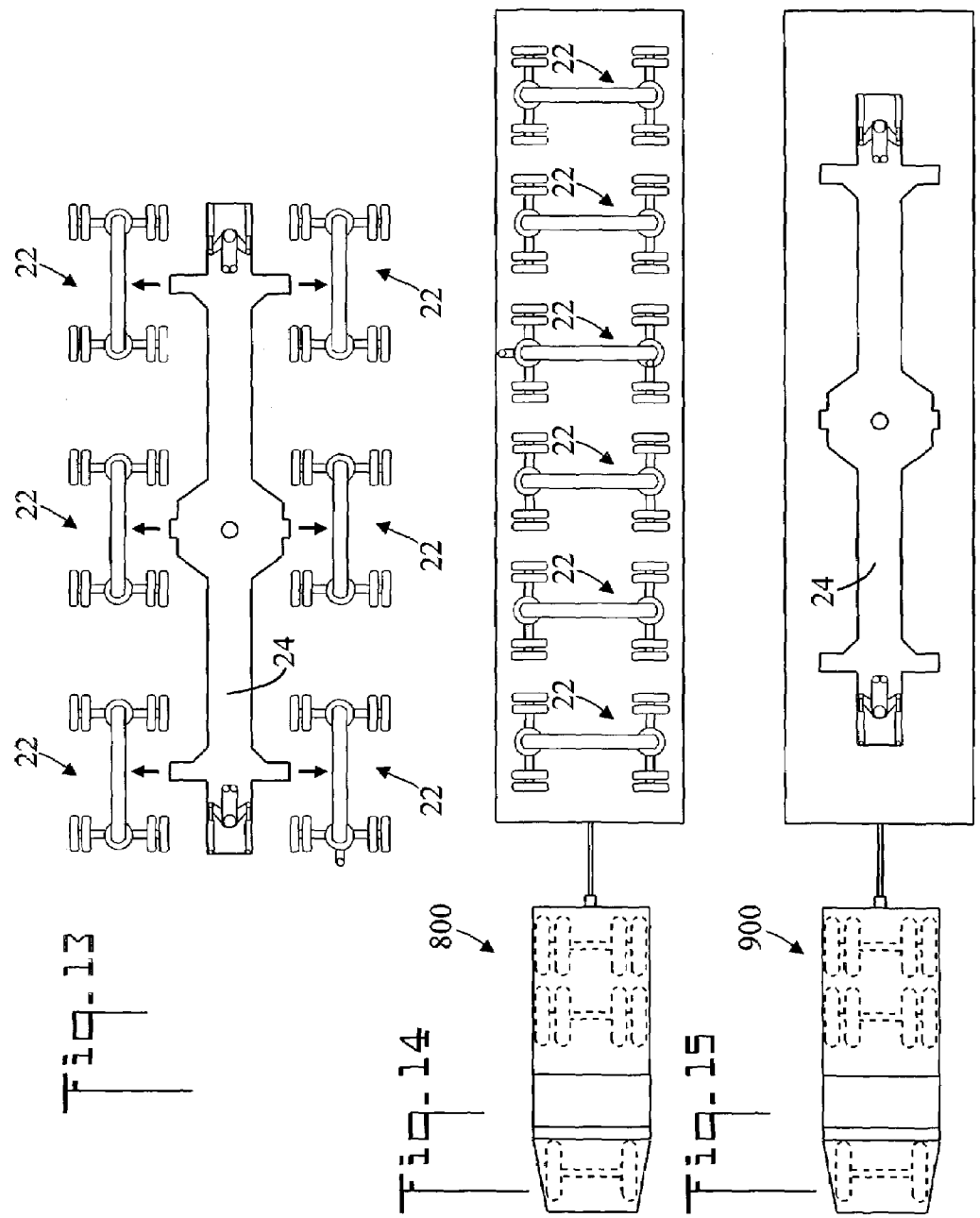

MODULAR TRANSPORT VEHICLE AND METHOD OF USE

CROSS REFERENCE TO RELATED APPLICATION

This application claims the filing benefit under 35 U.S.C. § 119(e) of U.S. Provisional Application No. 60/383,554, filed May 24, 2002, which is included herein by reference.

TECHNICAL FIELD

The present invention pertains generally to multi-axle transport vehicles for moving heavy loads, and more particularly to a modular transport vehicle which can itself be readily transported, and which has an adjustable width.

BACKGROUND OF THE INVENTION

Heavy hauling vehicles for moving transformers, cranes, boats, industrial equipment, and other heavy objects are well known in the art. An example of such a vehicle is given in U.S. Pat. No. 4,943,078 which discloses a heavy load hauler for traveling on conventional roadways for moving heavy construction equipment such as cranes or the like from one work site to another. The hauler includes a front tractor drawn carriage, a rear carriage, and a load unit between and carried by the carriages. The front carriage is supported upon a multiplicity of independent wheel and axle units. There is a first fifth wheel coupling at the leading end of the front carriage for connecting to the fifth wheel coupling of a tractor. A second fifth wheel coupling is spaced rearwardly. The load carrying rear carriage is also supported upon a multiplicity of independent wheel and axle units. There is a fifth wheel coupling intermediate the leading and trailing ends of the carriage. The load unit has forwardly and rearwardly projecting goosenecks. Each gooseneck has a fifth wheel coupling. The one on the forwardly projecting gooseneck connects to the fifth wheel coupling on the front carriage. The one on the rearwardly projecting gooseneck connects to the fifth wheel coupling on the rear carriage. The load unit may be either the crane itself or a flatbed upon which the crane is carried. At least some of the independent wheel and axle units are steerably mounted on their carriages. Each wheel and axle unit has its wheels supported by a hydraulic suspension. Hydraulic circuitry interconnects all of the suspensions so as to equally distribute the load among all of the wheel units. Steering of the independent wheel and axle units is interphased for the front and rear carriages by a pair of operatively associated interrelated inline valve cylinder units. FIG. 12A shows a valve 718 used in a power steering system which is coupled to a connecting link 703.

Other heavy hauling vehicles are sold by Goldhofer Fahrzeugwerk G.m.b.H. of Memmingen, Germany; Nicolas of Champs Sur Yonne, France; and Talbert of Rensselaer, Ind.

Improved systems having automatic steering at all speeds and suspension systems that respond rapidly to the varying road conditions imposed by higher speeds would greatly reduce the time and effort required to move the vehicle to the load, move the load, and return the vehicle to storage.

SUMMARY OF THE INVENTION

The present invention is directed to a modular transport vehicle for carrying heavy loads and a method of using the vehicle. The modular transport vehicle includes one or more hauling carriages which may be (1) readily disassembled for transportation from location to location by conventional means, and (2) can be varied in width to accommodate road conditions and/or governmental regulations. The invention specifically teaches away from prior art transport vehicles by allowing the transport vehicle of the present invention itself to be moved from location to location using conventional transportation means.

In accordance with a preferred embodiment of the invention, a modular transport vehicle includes one or more hauling carriages each of which include a plurality of dollies, a central spine, and a corresponding plurality of connectors. Each dolly is removably connected to the central spine by a connector.

In accordance with an aspect of the invention, the connector includes a connecting member which connects the dollies to the central spine. Connecting members of different widths may be used to change the overall width of the transport vehicle.

In accordance with another aspect of the invention, the hauling carriage may be disassembled so that its components may be moved from location to location by conventional transportation means.

Other aspects of the present invention will become apparent from the following detailed description, taken in conjunction with the accompanying drawings, which illustrate, by way of example, the principles of the invention.

BRIEF DESCRIPTION OF THE DRAWINGS

FIG. 1 is a side elevation view of a prior art multi-axle transport vehicle for moving heavy loads;

FIG. 2 is a top plan view of the vehicle of FIG. 1;

FIG. 3 is a side elevation view of a second prior art transport vehicle;

FIG. 4 is a partial enlarged top plan view of the vehicle of FIG. 3;

FIG. 5 is an enlarged top plan view of a hauling carriage of a modular transport vehicle in accordance with the present invention;

FIG. 6 is a simplified enlarged top plan view showing the dollies, central spine, and connectors of the hauling carriage;

FIG. 7 is an enlarged fragmented top plan view of area 7 of FIG. 6;

FIG. 8 is an enlarged top plan view of area 8 of FIG. 7;

FIG. 9 is an enlarged side elevation view along direction 9 of FIG. 7;

FIG. 10 is an enlarged top plan view of the first and second flanges of FIG. 8;

FIG. 13 is a top plan view of the hauling carriage showing the dollies removed from the central spine;

FIG. 14 is a top plan view of the dollies loaded on an external carrier;

FIG. 15 is a top plan view of the central spine loaded on an external carrier; and, FIG. 16 is an enlarged side elevation view of a dolly.

DETAILED DESCRIPTION OF THE INVENTION

Figure 12:
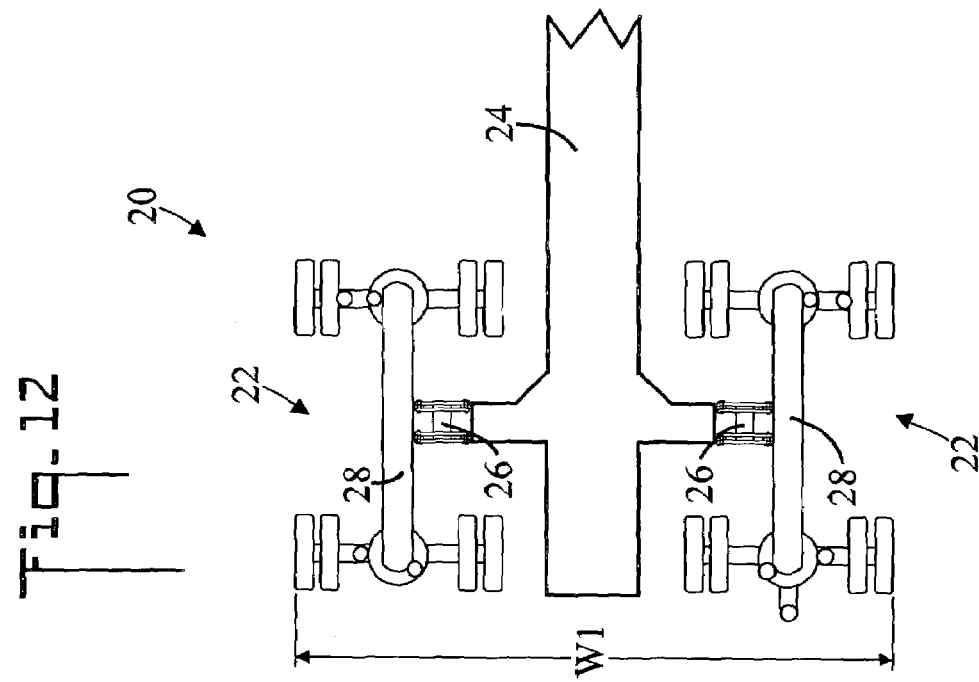
FIG. 12 is an enlarged top plan view of the dollies and central spine with the wider connecting member.

FIGS. 1 and 2 illustrate side elevation and top plan views, respectively, of a prior art multi-axle transport vehicle 500 for moving heavy loads. The vehicle 500 has a front dolly 502 and a pair of rear dollies 504 upon which a load 506 rests. Dollies 502 and 504 are permanently attached to the bed of the transport vehicle. The front dolly 502 and rear dolly 504 each have two axles 505 with four tires 507. Axles 505 are rotatable about a vertical pivot axis 509 thereby allowing the axles 505 and tires 507 to turn to the right or left. The axles 505 are connected to the frames of the dollies 502, 504 by a suspension system which controls the vertical movement of the axles 505. A towing vehicle 508 such as a tractor pulls transport vehicle 500 using a tow bar 510.

FIGS. 3 and 4 are side elevation and partial enlarged top plan views, respectively, of a second prior art transport vehicle 600. Transport vehicle 600 includes front hauling carriage 602 and rear hauling carriage 604. Each hauling carriage has a plurality of dollies 606 such as the six shown. The tops of the dollies 606 are connected to a bed 607. Each dolly 606 has two rotatable axles 608 each having four wheels 610. Axles 608 are rotatably mounted to an axle beam 612. The dollies 606 are mechanically linked together by turning struts 615 which cause the axles 608 to rotate in a desired manner as transport vehicle 600 turns. A load bed 614 is attached to two goosenecks 616 which rotatably connect to hubs 618 of hauling carriages 602 and 604. A heavy load 700 such as a large transformer is carried by load bed 614.

FIG. 5 illustrates an enlarged top plan view of a hauling carriage of a modular transport vehicle in accordance with the present invention, generally designated as 20. Two such hauling carriages 20 are typically utilized in a configuration such as shown in FIG. 3 connected by two goosenecks and a load bed. However, one carriage 20 could be used by itself for some loads. Hauling carriage 20 includes a plurality of dollies 22 such as the six in the embodiment shown. Each dolly 22 has two axles 50 and 52 with four wheels 54, 56, 58 and 60 fitted on each axle as shown in FIG. 5. An elongated central member 28 connects the two axles 50 and 52 together. Dollies 22 are removably connected to a central spine 24 by a corresponding plurality of connectors 26. Six dollies 22 and connectors 26 are used in the embodiment shown. Each dolly 22 is removably connected to central spine 24 by one connector 26. The component identified as the central spine 24 in FIGS. 5–13 herein is hereinafter typically referred to as the spine 24 for ease of reference and simplicity. However, it should be understood that a recitation of the spine 24 in this specification is to be interpreted as the central spine 24.

FIG. 6 is a simplified enlarged top plan view showing the dollies 22, central spine 24, and connectors 26 of the hauling carriage 20.

FIG. 7 is an enlarged fragmented top plan view of dollies 22, spine 24, and connectors 26. FIG. 8 is an enlarged top plan view of area 8 of FIG. 7. FIG. 9 is an enlarged side elevation view along direction 9 of FIG. 7. Connector 26 comprises a plurality of components which are shown in FIGS. 7, 8, and 9. Each dolly 22 has an elongated central member 28 having a vertical side 30 (also refer to FIG. 16) and a middle portion 32. A pair of first flanges 34 are disposed on vertical side 30 of dolly 22 at middle portion 32 of elongated central member 28. Spine 24 has a vertical side 36. A pair of second flanges 38 are disposed on vertical side 36 of spine 24. A connecting member 40 connects first flanges 34 of dolly 22 to second flanges 38 of spine 24. The connection is effected by pins 42. The connecting members 40 have a width w which determines the overall width W of hauling carriage 20 as is depicted in FIG. 7. That is, wider connecting members 40 will result in a wider transverse wheel base W.

FIG. 10 is an enlarged top plan view of first flanges 34 and second flanges 38 of FIG. 8 with connecting member 40 removed.

Figure 11:
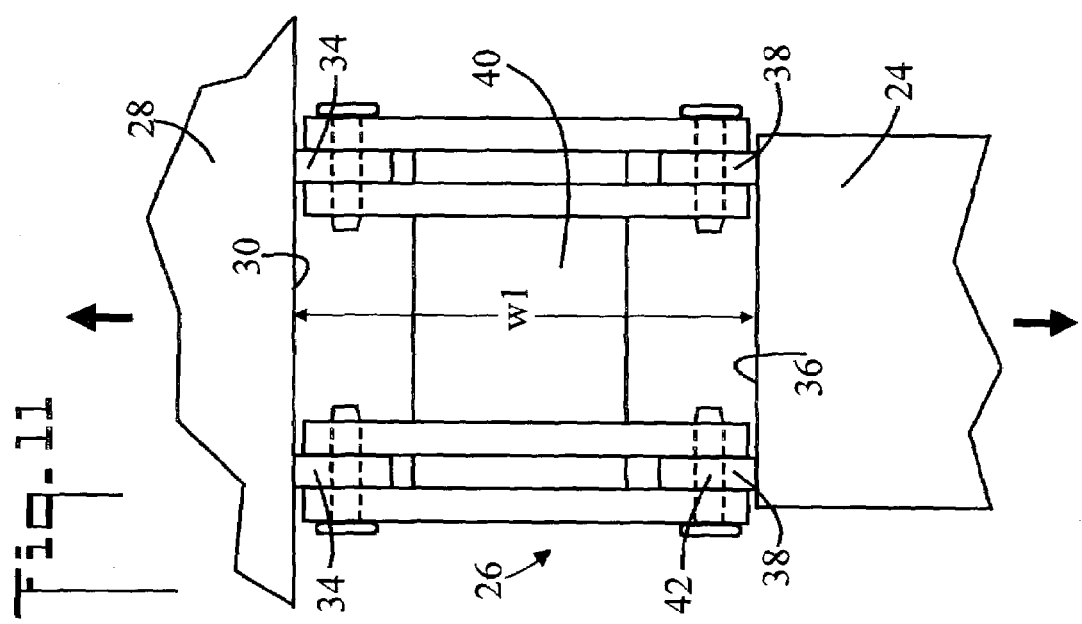
FIG. 11 is an enlarged top plan view showing the installation of a wider connecting member.

FIG. 11 is an enlarged top plan view showing the installation of a wider connecting member 40 having a width w1 which is wider than the width w of FIG. 8.

FIG. 12 is an enlarged top plan view of dollies 22 and spine 24 similar to FIG. 7 but with the wider connecting members 40 of FIG. 11 installed. The resulting width of hauling carriage 20 is W1. In a preferred embodiment of the present invention, multiple sets of connecting members 40 are provided having different widths. A desired width of hauling carriage 20 may be established by selecting a set of connecting members 40 of a particular width (e.g. w1 vs. w).

FIG. 13 is a top plan view of the hauling carriage 20 showing the dollies 22 removed from spine 24. The removal is typically effected by supporting spine 24 with jacks and removing connecting members 40.

FIG. 14 is a top plan view of dollies 22 loaded on a conventional external carrier 800 such as a truck and flat bed trailer. Other carriers 800 could also be utilized such as a railroad car.

FIG. 15 is a top plan view of central spine 24 loaded onto an external carrier 900. By loading dollies 22 and central spine 24 onto conventional external carriers, the components of the transport vehicle may be more conveniently moved between job sites using only one lane of a highway rather than the two lanes which are typically needed to move the assembled transport vehicle. It may be appreciated that the goosenecks and load bed of the transport vehicle may be similarly moved in a disassembled state.

Figure 16:
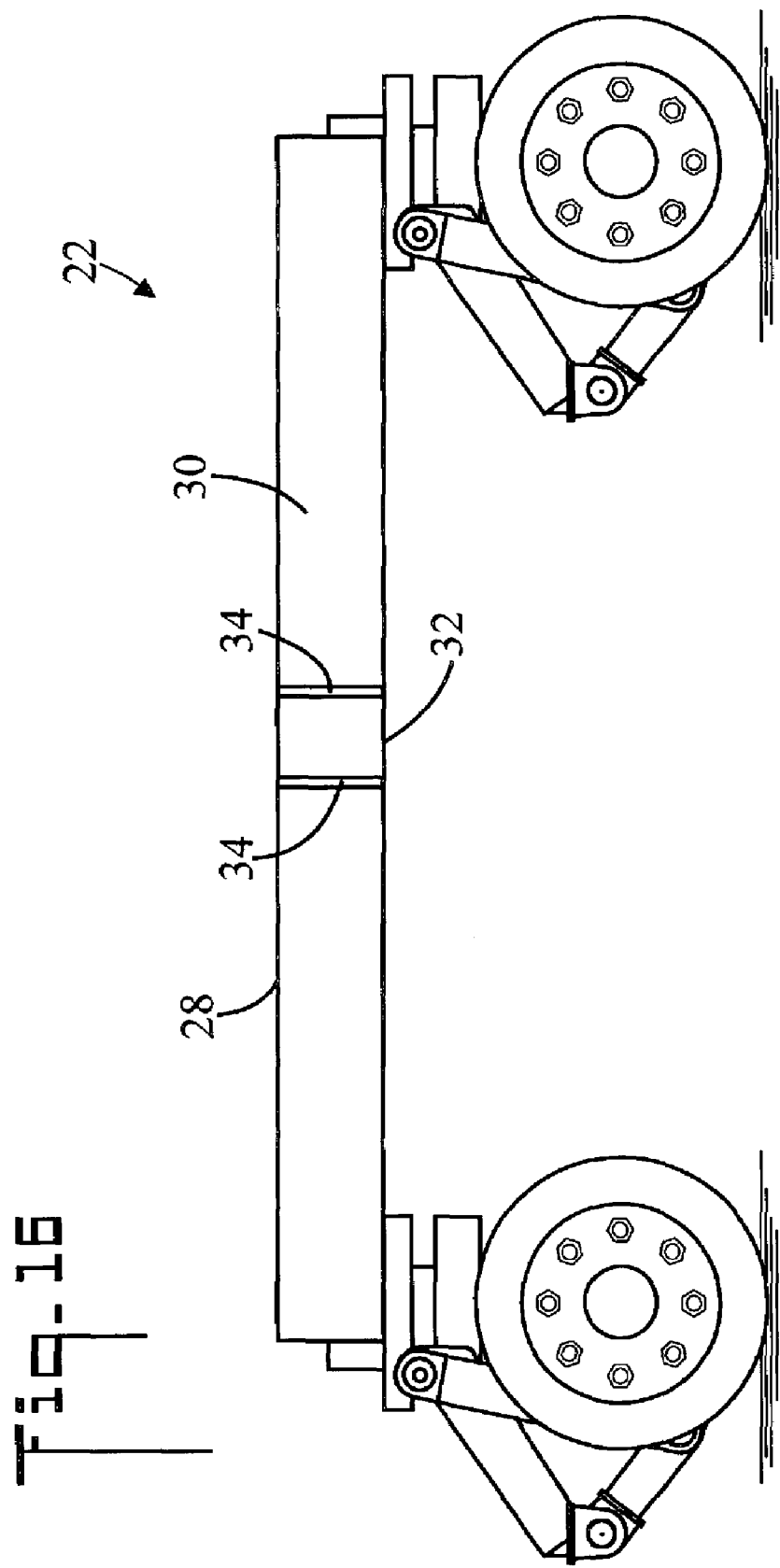

FIG. 16 is an enlarged side elevation view of a dolly 22 showing central member 28 having vertical side 30 and first flanges 34 disposed at middle portion 32. Dolly 22 stands by itself and is movable by itself on its four wheel sets. Top views of dollies by themselves and not connected to the spine are shown in FIG. 15.

In terms of use, a method of establishing a width of a transport vehicle, includes:
 (a) defining a desired width W of the transport vehicle (for example to comply with governmental regulations);
 (b) providing a hauling carriage 20 including:
  a plurality of dollies 22;
  a spine 24;
  a corresponding plurality of connecting members 40, connecting members 40 having a width w, the width w of connecting members 40 selected to result in desired width W of the transport vehicle;
  wherein each dolly 22 is removably connected to spine 24 by connecting members 40; and,
 (c) connecting dollies 22 to spine 24 using connecting members 40 having selected width w.

The method may further include:
 in step (b), each dolly 22 including an elongated central member 28 having a vertical side 30 and a middle portion 32;
 in step (b), a pair of first flanges 34 disposed on vertical side 30 of dolly 22 at middle portion 32 of elongated central member 28;
 in step (b), central spine 24 having a vertical side 36;
 in step (b), a pair of second flanges 38 disposed on vertical side 36 of central spine 24; and
 in step (c), connecting member 40 connecting first flanges 34 of dolly 22 to second flanges 38 of central spine 24.

In another use of the present invention, a method of transporting a hauling carriage 20 of a transport vehicle includes:

(a) providing at least one external carrier 800;
(b) providing a hauling carriage 20 including:
 a plurality of dollies. 22;
 a spine 24;
 a corresponding plurality of connectors 26; and,
 wherein each dolly 22 is removably connected to spine 24 by a connector 26;
(c) removing the plurality of dollies 22 from spine 24;
(d) loading the plurality of dollies 22 and spine 24 onto the at least one external carrier 800; and,
(e) using the at least one external carrier 800 to move the plurality of dollies 22 and spine 24 to a new location.

The method of transporting may further include:
prior to step (a), determining that the number of miles to be traveled in step (e) is greater than a predetermined number. That is, if the number of miles is great, for example 500, then it may be more cost effective to move the disassembled transport vehicle on conventional external carriers. However, if the number of miles is small, for example 10, then it is probably more cost effective to move the assembled transport vehicle.

The preferred embodiments of the invention described herein are exemplary and numerous modifications, variations, and rearrangements can be readily envisioned to achieve an equivalent result, all of which are intended to be embraced within the scope of the appended claims.

We claim:

1. A modular transport vehicle, comprising:
 a hauling carriage including:
  a plurality of dollies;
  a central spine;
  a corresponding plurality of connectors;
  each said connector further including:
   each said dolly including an elongated central member having a vertical side, said elongated central member having a middle portion;
   a pair of first flanges disposed on said vertical side of said dolly at said middle portion of said elongated member;
   said central spine having a vertical side;
   a pair of second flanges disposed on said vertical side of said central spine; and,
   a connecting member which connects said first flanges of said dolly to said second flanges of said central spine; and,
  each said dolly removably connected to said central spine by one of said plurality of connectors; and,
  wherein said hauling carriage is configured to carry a load on said central spine when said central spine is carried by said dollies.

2. A modular transport vehicle according to claim 1, further including:
 said connecting member including multiple sets of connecting members having different widths; and,
 wherein a desired width of said hauling carriage is established by selecting a set of connecting members of a particular width.

3. A method of establishing a width of a transport vehicle, comprising:
(a) defining a desired said width of said transport vehicle;
(b) providing a hauling carriage including:
 a plurality of dollies;
 each said dolly including an elongated central member having a vertical side, said elongated central member having a middle portion, and each said dolly including a pair of first flanges disposed on said vertical side of said dolly at said middle portion;
 a central spine;
 said central spine having a vertical side and a pair of second flanges disposed on said vertical side of said central spine for each said dolly;
 a corresponding plurality of connecting members, said connecting members having a width, said width of said connecting members selected to result in said desired width of said transport vehicle; and,
 each said dolly removably connected to said central spine by one of said connecting members; and,
(c) connecting said dollies to said central spine by connecting said connecting members having said selected width from said first flanges of said dollies to said second flanges of said central spine so that said transport vehicle is configured to carry a load on said central spine when said central spine is carried by said dollies.

4. A method of transporting a hauling carriage of a transport vehicle, comprising:
(a) providing at least one external carrier;
(b) providing a hauling carriage including:
 a plurality of dollies;
 each said dolly including an elongated central member having a vertical side, said elongated central member having a middle portion;
 a central spine having a vertical side;
 a corresponding plurality of connectors;
 each said connector including:
  each said dolly including a pair of first flanges disposed on said vertical side of said dolly at said middle portion of said elongated member;
  a pair of second flanges disposed on said vertical side of said central spine for each said dolly;
  a connecting member;
  said connecting members removably connecting said first flanges of said dollies to said second flanges of said central spine; and,
  wherein said hauling carriage is configured to carry a load on said central spine when said central spine is carried by said dollies;
(c) removing said plurality of dollies from said central spine by removing said connecting members;
(d) loading said plurality of dollies and said central spine onto said at least one external carrier; and,
(e) using said at least one external carrier to move said plurality of dollies and said central spine to a new location.

5. A hauling carriage having a desired width, comprising:
 a plurality of dollies;
 each said dolly including an elongated central member having a vertical side, said elongated central member having a middle portion, and each said dolly including a pair of first flanges disposed on said vertical side of said dolly at said middle portion;
 a central spine;
 said central spine having a vertical side and a pair of second flanges disposed on said vertical side of said central spine for each said dolly;
 multiple sets of connecting members having different widths; and,
 wherein said desired width of said hauling carriage is established by selecting a set of connecting members of a particular width and each of said dollies is connected to said central spine by one of said selected connecting members from said first flanges of said dolly to said second flanges of said central spine so that said hauling carriage is configured to carry a load on said central spine when said central spine is carried by said dollies.

* * * * *